(12) United States Patent
Takagi

(10) Patent No.: US 9,261,185 B2
(45) Date of Patent: Feb. 16, 2016

(54) DRIVE TRANSMISSION MECHANISM AND IMAGE FORMING APPARATUS INCLUDING SAME

(75) Inventor: Hiroaki Takagi, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 570 days.

(21) Appl. No.: 13/337,797

(22) Filed: Dec. 27, 2011

(65) Prior Publication Data

US 2012/0190489 A1    Jul. 26, 2012

(30) Foreign Application Priority Data

Jan. 24, 2011   (JP) ................................ 2011-012021

(51) Int. Cl.
| | |
|---|---|
| F16H 7/02 | (2006.01) |
| F16C 19/04 | (2006.01) |
| F16H 57/021 | (2012.01) |
| G03G 15/00 | (2006.01) |
| G03G 21/16 | (2006.01) |

(52) U.S. Cl.
CPC ............ *F16H 57/021* (2013.01); *G03G 15/757* (2013.01); *G03G 21/1647* (2013.01)

(58) Field of Classification Search
CPC . F16H 57/021; G03G 15/757; G03G 21/1647
USPC ................................................. 474/148, 152
See application file for complete search history.

(56) References Cited

U.S. PATENT DOCUMENTS

| | | | |
|---|---|---|---|
| 7,467,562 B2 | 12/2008 | Nomura et al. | |
| 2001/0029215 A1* | 10/2001 | Ohyama et al. | ............... 474/148 |
| 2003/0068177 A1* | 4/2003 | Kitayama | ..................... 399/167 |
| 2004/0009011 A1* | 1/2004 | Ehara | ............................. 399/167 |
| 2005/0031374 A1 | 2/2005 | Nagashima et al. | |
| 2006/0275053 A1 | 12/2006 | Nagashima et al. | |
| 2010/0234157 A1* | 9/2010 | Kikukawa et al. | ............ 474/171 |

FOREIGN PATENT DOCUMENTS

| | | |
|---|---|---|
| CN | 1577169 | 2/2005 |
| CN | 1842666 | 10/2006 |

(Continued)

OTHER PUBLICATIONS

Chinese Office Action dated Jan. 6, 2014 issued in corresponding Chinese Application No. 201110448596.8.

(Continued)

*Primary Examiner* — William E Dondero
*Assistant Examiner* — Diem Tran
(74) *Attorney, Agent, or Firm* — Harness, Dickey & Pierce, P.L.C.

(57) ABSTRACT

A drive transmission mechanism including a shaft including a reduced diameter portion at an outboard end, an engaging portion inboard of the reduced diameter portion, and an installation portion inboard of the engaging portion and having the same diameter as the engaging portion, a first bearing having an inner ring onto which the reduced diameter portion is fitted, a connecting member provided to the shaft and including a main body into which the installation portion is fitted and a fitting portion provided to the main body on a side in which the engaging portion is provided to accommodate the engaging portion, and a second bearing engaging the shaft to support the shaft at an inboard end of the shaft opposite the first bearing with the connecting member interposed between the first and second bearings.

7 Claims, 4 Drawing Sheets

(56) References Cited

FOREIGN PATENT DOCUMENTS

| CN | 100482979 | 4/2009 |
|---|---|---|
| JP | S51-156354 U | 12/1976 |
| JP | 10-174362 A | 6/1998 |
| JP | H10-148214 A | 6/1998 |
| JP | 2002-266952 A | 9/2002 |
| JP | 2009-103287 A | 5/2009 |

OTHER PUBLICATIONS

Japanese Office Action dated Jun. 24, 2014 for corresponding Japanese Application No. 2011-012021.

* cited by examiner

DRIVE TRANSMISSION MECHANISM AND IMAGE FORMING APPARATUS INCLUDING SAME

CROSS-REFERENCE TO RELATED APPLICATIONS

The present patent application is based on and claims priority pursuant to 35 U.S.C. §119 from Japanese Patent Application No. 2011-012021, filed on Jan. 24, 2011, in the Japan Patent Office, which is incorporated by reference herein in its entirety.

BACKGROUND OF THE INVENTION

1. Field of the Invention

Exemplary aspects of the present invention generally relate to a drive transmission mechanism and an image foaming apparatus including the drive transmission mechanism, and more particularly to a drive transmission mechanism having an uncomplicated configuration and good transmission property and an image forming apparatus including the drive transmission mechanism.

2. Description of the Prior Art

Gears, timing belts, and pulleys are generally used for a drive transmission mechanism that transmits a drive force generated by a motor or the like. In the drive transmission mechanism, each of the gears or the pulleys (hereinafter both referred to as drive transmission members) is fitted onto a shaft supported at both ends by bearings. It is important for accurate transmission of the drive force to prevent the drive transmission member and the shaft from being moved not only in a radial direction but also in a thrust direction. In order to restrict movement of the shaft in the thrust direction, the bearing is typically sandwiched between an enlarged diameter portion at the end of the shaft and the drive transmission member fitted onto the shaft.

In such a configuration, however, the drive transmission member may contact a shield plate fixed to an outer ring of the bearing. Consequently, although the shield plate is stationary, the drive transmission member is rotated together with an inner ring of the bearing. As a result, vibration due to friction between the drive transmission member and the shield plate may cause uneven rotation of the shaft.

To solve the above-described problem, the shaft can be given a portion of enlarged or reduced diameter, with a step thus formed at a boundary between a normal diameter portion of the shaft and the enlarged or reduced diameter portion is pressed against the inner ring of the bearing to restrict movement of the shaft in the thrust direction. However, the drive transmission member needs to be fitted onto the shaft, thereby preventing easy assembly of the drive transmission mechanism.

In another approach, as illustrated in FIG. 1, a drive transmission mechanism 110 includes a drive transmission member 30 which is loosely fitted onto a shaft 20 to facilitate assembly of the drive transmission mechanism 110. Accordingly, reliable transmission of the drive force can be achieved even in a case in which a pin 40 inserted into the shaft 20 and a pin seating formed in the drive transmission member 30 contact each other to loosely fit the drive transmission member 30 onto the shaft 20.

However, with such a configuration it is necessary to fix a position of the drive transmission member 30 in the thrust direction with an E-ring (or C-ring) 70 in order to restrict movement of the drive transmission member 30 in the thrust direction. Therefore, a space into which the E-ring (or C-ring) 70 is inserted must be provided between the drive transmission member 30 and a bearing 10. Consequently, a length of the shaft 20 is increased, thereby possibly causing uneven rotation of the shaft 20.

SUMMARY

In view of the foregoing, illustrative embodiments of the present invention provide a novel drive transmission mechanism having an uncomplicated configuration and good transmission property and an image forming apparatus including the drive transmission mechanism.

In one illustrative embodiment, a drive transmission mechanism includes a shaft including a reduced diameter portion at an outboard end, an engaging portion inboard of the reduced diameter portion, and an installation portion inboard of the engaging portion and having the same diameter as the engaging portion, a first bearing having an inner ring onto which the reduced diameter portion of the shaft is fitted, a connecting member provided to the shaft and including a main body into which the installation portion is fitted and a fitting portion provided to the main body on a side in which the engaging portion is provided to accommodate the engaging portion, and a second bearing engaging the shaft to support the shaft at an inboard end of the shaft opposite the first bearing with the connecting member interposed between the first and second bearings. A lateral surface of the fitting portion contacts a lateral surface of the inner ring of the first bearing.

In another illustrative embodiment, an image forming apparatus includes the drive transmission mechanism described above.

Additional features and advantages of the present disclosure will be more fully apparent from the following detailed description of illustrative embodiments, the accompanying drawings, and the associated claims.

BRIEF DESCRIPTION OF THE DRAWINGS

A more complete appreciation of the disclosure and many of the attendant advantages thereof will be more readily obtained as the same becomes better understood by reference to the following detailed description of illustrative embodiments when considered in connection with the accompanying drawings, wherein.

DETAILED DESCRIPTION OF ILLUSTRATIVE EMBODIMENTS

Figure 1:
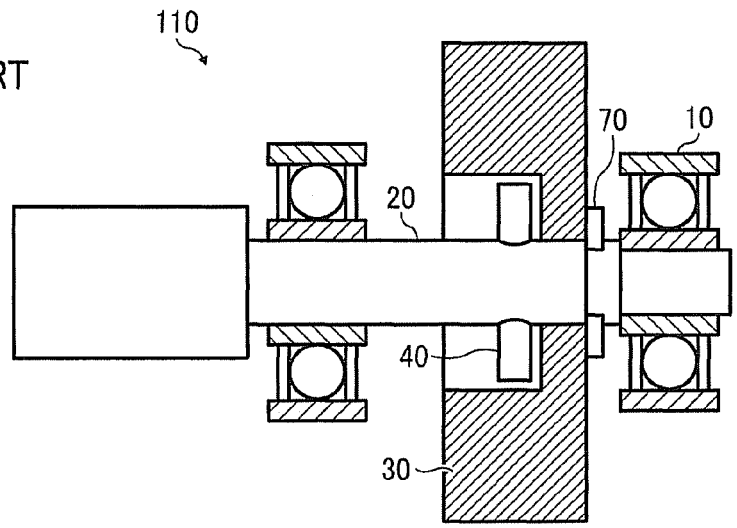
FIG. 1 is a vertical cross-sectional view illustrating an example of a configuration of a related-art drive transmission mechanism.

In describing illustrative embodiments illustrated in the drawings, specific terminology is employed for the sake of clarity. However, the disclosure of this patent specification is not intended to be limited to the specific terminology so selected, and it is to be understood that each specific element includes all technical equivalents that operate in a similar manner and achieve a similar result.

Illustrative embodiments of the present invention are now described below with reference to the accompanying drawings.

In a later-described comparative example, illustrative embodiment, and exemplary variation, for the sake of simplicity the same reference numerals will be given to identical constituent elements such as parts and materials having the same functions, and redundant descriptions thereof omitted unless otherwise required.

Figure 2A:
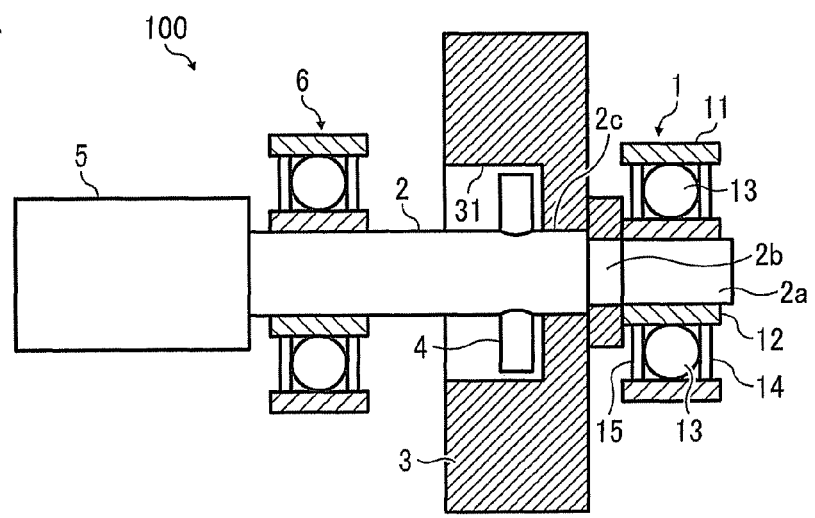
FIGS. 2A and 2B are vertical cross-sectional views illustrating an example of a configuration of a drive transmission mechanism according to illustrative embodiments viewed from different angles, respectively.
Figure 2B:
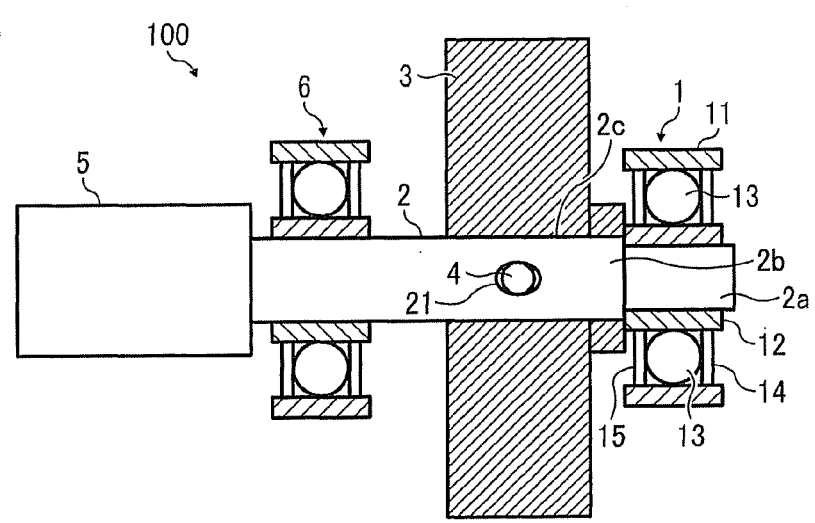

FIGS. 2A and 2B are vertical cross-sectional views illustrating an example of a configuration of a drive transmission mechanism 100 according to illustrative embodiments viewed from different angles, respectively. An angle of rotation of a shaft 2 of a driven member 5 shown in FIGS. 2A and 2B, respectively, differs by 90°.

The drive transmission mechanism 100 includes the shaft 2 supported by a first ball bearing assembly 1 and a second ball bearing assembly 6 at opposed ends thereof, respectively. The first ball bearing assembly 1 includes an outer ring 11, an inner ring 12, multiple balls 13 disposed between the inner and outer rings 12 and 11, and inner and outer lateral shields 15 and 14 that are fixed to the outer ring 11 and which cover the multiple balls 13.

The second ball bearing assembly 6 is loosely fitted onto the shaft 2 at the other end of the shaft 2 opposite the first ball bearing assembly 1 and has the same configuration as the first ball bearing assembly 1.

A connecting member formed of synthetic resin is loosely fitted onto the shaft 2 between the first and second ball bearing assemblies 1 and 6. In illustrative embodiments, the connecting member serves as a drive transmission member 3 such as a pulley and a gear.

Figure 3:
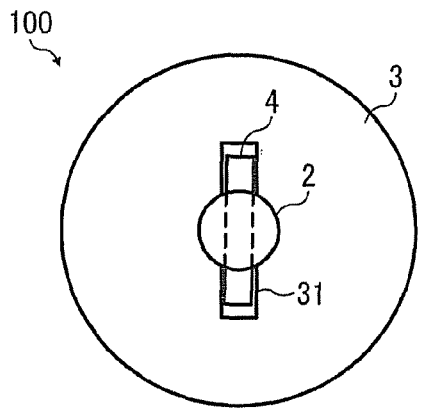
FIG. 3 is a side view illustrating an example of a configuration of a drive transmission member included in the drive transmission mechanism.

FIG. 3 is a side view illustrating a configuration of the drive transmission member 3 viewed from left in FIGS. 2A and 2B. A notch 31 extending in a radial direction is formed on a left lateral surface of the drive transmission member 3, and a pin 4 inserted into the shaft 2 is accommodated within the notch 31. When the drive transmission member 3 is rotated, the pin 4 contacts a lateral wall of the notch 31 and is rotated as the drive transmission member 3 rotates, thereby transmitting a drive force to the shaft 2.

It is preferable that the pin 4 does not contact a bottom surface of the notch 31, so that the drive transmission member 3 is prevented from being tilted toward the thrust direction when the pin 4 is inserted into the shaft 2 at a slant toward the thrust direction.

Figure 4A:
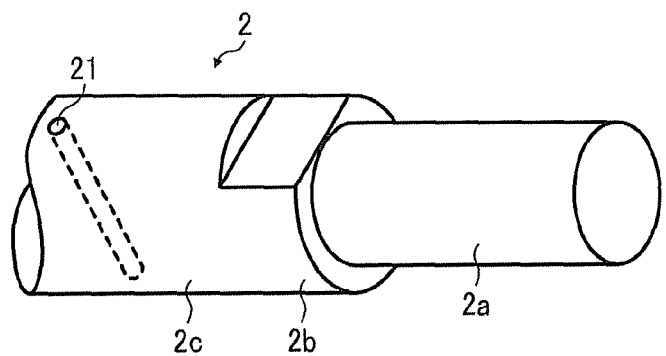
FIG. 4A is a perspective view illustrating an example of a configuration of one end of a shaft provided to the drive transmission mechanism.
Figure 4B:
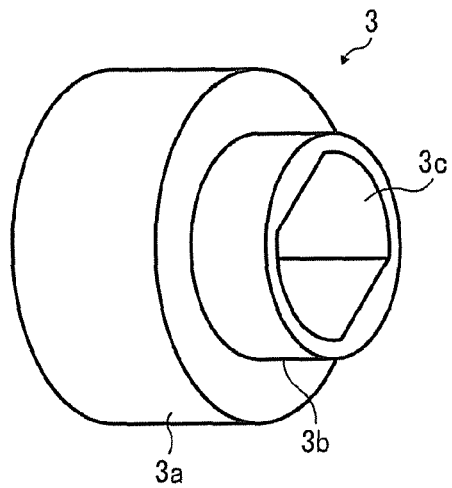
FIG. 4B is a perspective view illustrating the configuration of the drive transmission member.

FIG. 4A is a perspective view illustrating an example of a configuration of a right end of the shaft 2, and FIG. 4B is a perspective view illustrating the configuration of the drive transmission member 3. As illustrated in FIG. 4A, the right end of the shaft 2 has a reduced diameter portion 2a at its outboard end, an engaging portion 2b inboard of the reduced diameter portion 2a, and an installation portion 2c inboard of the engaging portion 2b.

The reduced diameter portion 2a, which is inserted into the inner ring 12 of the first ball bearing assembly 1, has a diameter r which is smaller than a diameter R of the engaging portion 2b. Thus, a step is formed at a boundary between the reduced diameter portion 2a and the engaging portion 2b to contact the inner ring 12 of the first ball bearing assembly 1 provided at the right end of the shaft 2. As a result, movement of the shaft 2 in the thrust direction is restricted.

The engaging portion 2b is fitted onto a fitting portion 3b of the drive transmission member 3, and has at least one fitting structure at a boundary with the installation portion 2c.

The installation portion 2c is fitted onto a main body 3a of the drive transmission member 3, and a pin hole 21 into which the pin 4 is inserted is provided inboard of the installation portion 2c.

As illustrated in FIG. 4B, the drive transmission member 3 is constructed of the main body 3a and the fitting portion 3b formed on a lateral surface of the main body 3a. The main body 3a and the fitting portion 3b are formed together as a single integrated unit to construct the drive transmission member 3, and a lateral surface of the fitting portion 3b contacts a lateral surface of the inner ring 12 of the first ball bearing assembly 1. A circular center hole through which the installation portion 2c of the shaft 2 passes is provided at the center of the main body 3a, and a center hole 3c of the fitting portion 3b that communicates with the center hole of the main body 3a has a fitting structure onto which the engaging portion 2b of the shaft 2 is fitted.

The fitting structure is formed at at least one position on each of an outer circumference of the engaging portion 2b of the shaft 2 and an inner circumference of the fitting portion 3b of the drive transmission member 3. A part of the shaft 2 including an outer circumferential surface thereof is removed to form the engaging portion 2b inserted into the center hole 3c of the fitting portion 3b of the drive transmission member 3.

Thus, at least an arc-shaped part of the shaft 2 is removed to form the engaging portion 2b having a D-shape or an oval shape. In such a case, the center hole 3c of the fitting portion 3b of the drive transmission member 3 has a D-shaped or oval hollow.

Alternatively, at least one notch may be formed in the circumferential surface of the shaft 2 to form the engaging portion 2b. In such a case, at least one protrusion extending in the thrust direction of the shaft 2 is provided in the center hole 3c of the fitting portion 3b.

In the example shown in FIGS. 4A and 4B, the fitting structure has an oval shape. Thus, leftward movement of the drive transmission member 3 relative to the shaft 2 is restricted by the fitting structure.

Employment of the drive transmission mechanism 100 according to illustrative embodiments in image forming apparatuses such as copiers, in which irregular transmission of the drive force considerably affects image quality, can provide higher-quality images.

Figure 5:
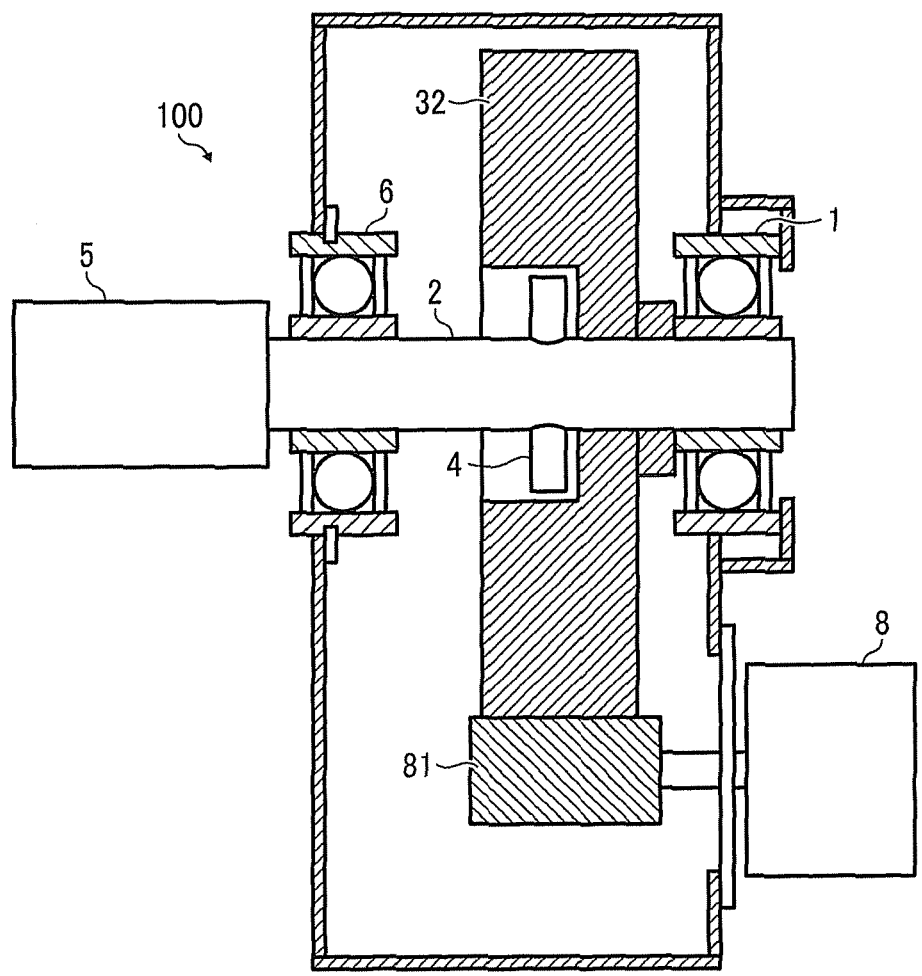
FIG. 5 is a vertical cross-sectional view illustrating another example of a configuration of a drive transmission mechanism according to illustrative embodiments.

FIG. 5 is a vertical cross-sectional view illustrating another example of a configuration of the drive transmission mechanism 100, in which a set of gears is used as the drive transmission member 3. A small gear 81 provided to an output shaft of a motor 8 engages a large gear 32 serving as the drive transmission member 3 to reduce number of rotations of the motor 8.

Figure 6:
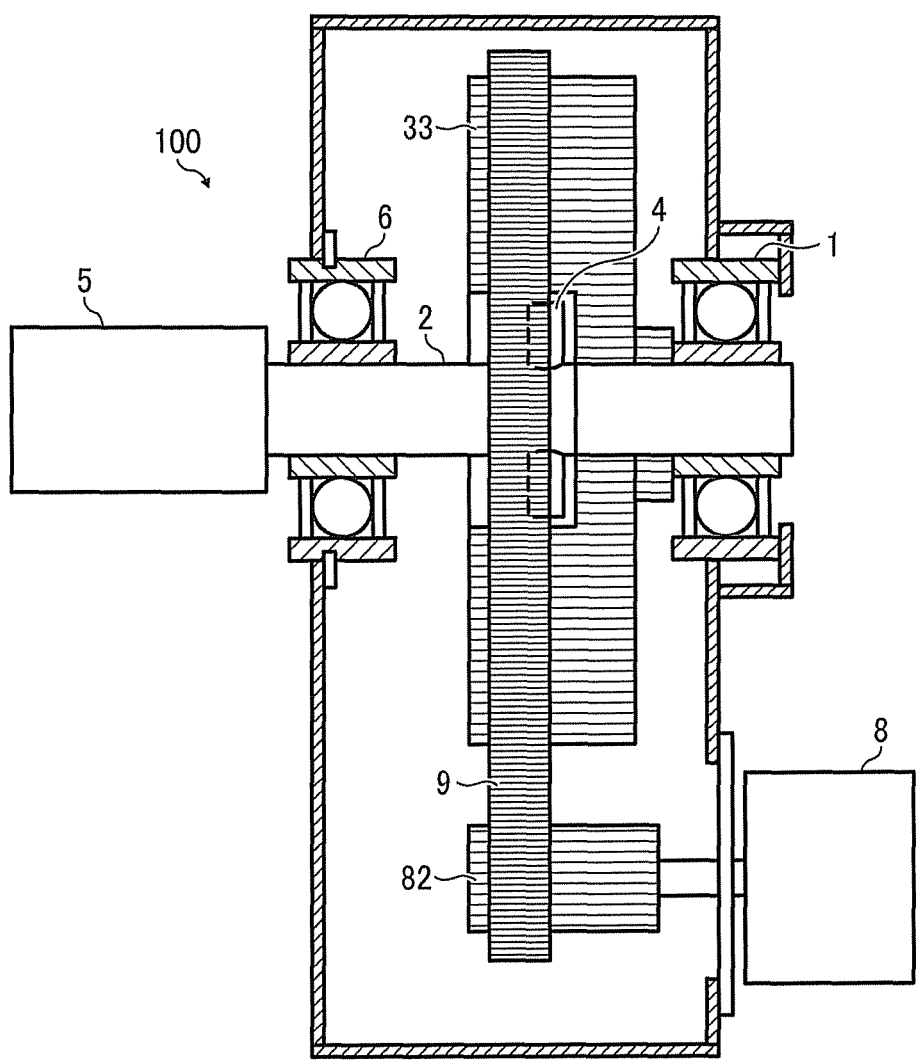
FIG. 6 is a vertical cross-sectional view illustrating yet another example of a configuration of a drive transmission mechanism according to illustrative embodiments.

FIG. 6 is a vertical cross-sectional view illustrating yet another example of a configuration of the drive transmission mechanism 100 in which a pulley and a timing belt are used as the drive transmission member 3. A small pulley 82 provided to the output shaft of the motor 8 is joined together with a large pulley 33 serving as the drive transmission member 3 by a timing belt 9 to reduce number of rotations of the motor 8.

Thus, the foregoing illustrative embodiment provide the drive transmission mechanism 100 having good transmission property.

Elements and/or features of different illustrative embodiments may be combined with each other and/or substituted for each other within the scope of this disclosure and appended claims.

Illustrative embodiments being thus described, it will be apparent that the same may be varied in many ways. Such exemplary variations are not to be regarded as a departure from the scope of the present invention, and all such modifications as would be obvious to one skilled in the art are intended to be included within the scope of the following claims.

The number of constituent elements and their locations, shapes, and so forth are not limited to any of the structure for performing the methodology illustrated in the drawings.

What is claimed is:

1. A drive transmission mechanism comprising:
    a shaft comprising a reduced diameter portion at an outboard end, an engaging portion inboard of the reduced diameter portion, and an installation portion inboard of the engaging portion, the engaging portion having a diameter that is less than a diameter of the installation portion and greater than a diameter of the reduced diameter portion, the installation portion including a pin inserted into a pin hole such that the pin extends through the installation portion in a direction perpendicular to an axis of the shaft and two ends of the pin project from opposite sides of the installation portion;
    a first bearing having an inner ring onto which the reduced diameter portion of the shaft is fitted, the first bearing being configured to allow rotation of the reduced diameter portion within the inner ring;
    a connecting member provided to the shaft and comprising,
        a female-type main body into which the installation portion is fitted, a center portion of the female-type main body including a notch to accommodate the two ends of the pin, and
        a female-type fitting portion projecting from the female-type main body on a side in which the engaging portion is provided, the female-type fitting portion having an inner diameter that is less than an inner diameter of the female-type main body such that the female-type main body accommodates the installation portion and the female-type fitting portion accommodates the engaging portion, a lateral surface of an end of the female-type fitting portion contacting a lateral surface of the inner ring of the first bearing, the female-type fitting portion and the notch being formed such that the pin does not contact a bottom surface of the notch; and
    a second bearing engaging the shaft to support the shaft at an inboard end of the shaft opposite the first bearing with the connecting member interposed between the first bearing and the second bearing,
    wherein the female-type fitting portion is between the first bearing and the second bearing along the axis of the shaft, and
    wherein the notch is between the female-type fitting portion and the second bearing along the axis of the shaft.

2. The drive transmission mechanism according to claim 1, wherein the engaging portion of the shaft and a hole provided in the female-type fitting portion of the connecting member have a D-shaped or oval cross-section.

3. The drive transmission mechanism according to claim 1, wherein the connecting member comprises a set of gears of unequal size.

4. The drive transmission mechanism according to claim 1, wherein the connecting member comprises two pulleys of unequal size and a timing belt entrained around the pulleys.

5. The drive transmission mechanism according to claim 1, wherein the connecting member is formed of synthetic resin.

6. An image forming apparatus comprising a drive transmission mechanism, the drive transmission mechanism comprising:
    a shaft comprising a reduced diameter portion at an outboard end, an engaging portion inboard of the reduced diameter portion, and an installation portion inboard of the engaging portion, the engaging portion having a diameter that is less than a diameter of the installation portion and greater than a diameter of the reduced diameter portion, the installation portion including a pin inserted into a pin hole such that the pin extends through the installation portion in a direction perpendicular to an axis of the shaft and two ends of the pin project from opposite sides of the installation portion;
    a first bearing having an inner ring onto which the reduced diameter portion of the shaft is fitted, the first bearing being configured to allow rotation of the reduced diameter portion within the inner ring;
    a connecting member provided to the shaft and comprising,
        a female-type main body into which the installation portion is fitted, a center portion of the female-type main body including a notch to accommodate the two ends of the pin, and
        a female-type fitting portion projecting from the female-type main body on a side in which the engaging portion is provided, the female-type fitting portion having an inner diameter that is less than an inner diameter of the female-type main body such that the female-type main body accommodates the installation portion and the female-type fitting portion accommodates the engaging portion, a lateral surface of an end of the female-type fitting portion contacting a lateral surface of the inner ring of the first bearing, the female-type fitting portion and the notch being formed such that the pin does not contact a bottom surface of the notch; and
    a second bearing engaging the shaft to support the shaft at an inboard end of the shaft opposite the first bearing with the connecting member interposed between the first bearing and the second bearing,
    wherein the female-type fitting portion is between the first bearing and the second bearing along the axis of the shaft, and
    wherein the notch is between the female-type fitting portion and the second bearing along the axis of the shaft.

7. A drive transmission mechanism comprising:
    a shaft comprising a reduced diameter portion at an outboard end, an engaging portion inboard of the reduced diameter portion, and an installation portion inboard of the engaging portion, the engaging portion having a diameter that is less than a diameter of the installation portion and greater than a diameter of the reduced diameter portion, the installation portion including a pin inserted into a pin hole such that the pin extends through the installation portion in a direction perpendicular to an axis of the shaft and two ends of the pin project from opposite sides of the installation portion;
    a first bearing having an inner ring onto which the reduced diameter portion of the shaft is fitted, the first bearing being configured to allow rotation of the reduced diameter portion within the inner ring;

a connecting member provided to the shaft and comprising, a female-type main body into which the installation portion is fitted, a center portion of the female-type main body including a notch to accommodate the two ends of the pin, and a female-type fitting portion projecting from the female-type main body on a side in which the engaging portion is provided, the female-type fitting portion having an inner diameter that is less than an inner diameter of the female-type main body such that the female-type main body accommodates the installation portion and the female-type fitting portion accommodates the engaging portion, a lateral surface of an end of the female-type fitting portion contacting a lateral surface of the inner ring of the first bearing, the female-type fitting portion and the notch being formed such that the pin does not contact a bottom surface of the notch; and a second bearing engaging the shaft to support the shaft at an inboard end of the shaft opposite the first bearing with the connecting member interposed between the first bearing and the second bearing, wherein the female-type fitting portion is between the first bearing and the second bearing along an axis of the shaft, wherein the notch is between the female-type fitting portion and the second bearing along the axis of the shaft, and wherein the connecting member includes a one of a set of gears and a set of pulleys between the first bearing and the second bearing.

\* \* \* \* \*